United States Patent
Dittmann et al.

(10) Patent No.: US 7,307,951 B2
(45) Date of Patent: Dec. 11, 2007

(54) TIMEOUT DETERMINATION METHOD AND APPARATUS

(75) Inventors: Gero Dittmann, Zurich (CH); Andreas Herkersdorf, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 10/417,258

(22) Filed: Apr. 17, 2003

(65) Prior Publication Data

US 2003/0202482 A1  Oct. 30, 2003

(30) Foreign Application Priority Data

Apr. 24, 2002  (EP) .................................. 02009130

(51) Int. Cl.
  *H04J 3/16* (2006.01)
  *H04L 12/66* (2006.01)
(52) U.S. Cl. ...................... 370/230; 370/252; 370/428
(58) Field of Classification Search ...................... None
  See application file for complete search history.

(56) References Cited

U.S. PATENT DOCUMENTS

| | | | | |
|---|---|---|---|---|
| 5,448,567 A | * | 9/1995 | Dighe et al. ................ | 370/233 |
| 5,491,815 A | * | 2/1996 | Basso et al. ................ | 713/502 |
| 5,894,481 A | * | 4/1999 | Book ......................... | 370/412 |
| 5,956,341 A | * | 9/1999 | Galand et al. .............. | 370/412 |
| 5,974,053 A | | 10/1999 | Bennett et al. | |
| 5,978,928 A | | 11/1999 | Rust | |
| 6,240,096 B1 | * | 5/2001 | Book ......................... | 370/412 |

\* cited by examiner

*Primary Examiner*—Chi Pham
*Assistant Examiner*—Soon D. Hyun
(74) *Attorney, Agent, or Firm*—Dwayne Nelson, Esq.; McGinn IP Law Group, PLLC

(57) ABSTRACT

A method (and apparatus) for determining, in a system including an m-bit time counter, whether an event-occurrence time lies after a predetermined timeout-value, includes reading out of a time-stamp memory a stored time-stamp value, determining the time-difference between the time-stamp value and the event-occurrence time, and determining whether the time-difference is larger than the predetermined timeout-value. The event-occurrence time is represented by a subset of the bits of the m-bit time counter, the subset being determined by a plurality of parameters including any two of a lower bit-position, an upper bit-position, and a subset width. The lower bit-position is dependent on the predetermined timeout-value.

19 Claims, 2 Drawing Sheets

TIMEOUT DETERMINATION METHOD AND APPARATUS

BACKGROUND OF THE INVENTION

1. Field of the Invention

The present invention generally relates to a method and apparatus for determining whether an event-occurrence time lies after a predetermined timeout-value.

2. Description of the Related Art

Communication systems move more and more towards keeping a state for individual data flows (e.g., for quality-of-service (QOS) features). With several thousand flows on a high-speed network link, the maintenance and handling of a per-flow state require considerably large memories. High-speed systems require on-chip implementation of this memory, and here memory size is critical. Even single bits that are saved on a per-flow state can help reduce the memory size, and hence the chip size, and thus make it cheaper.

A common piece of information that is kept as a part of a flow state is a time-stamp (e.g., the point in time) when the last packet of a flow arrived. These time stamps are mostly used to compare the idle-time of a flow (i.e., the difference between the time-stamp and the actual system time at the time of the arrival of the next packet), to a configured time-out value which may be identical for all state entries. The system time is usually implemented as a bit vector that counts ticks of the system clock. For a system clock rate of 350 MHz and a system wrap time of higher than one second, the time vector has a size of at least 29 bits. If state is kept for a number of 16 k flows, then the time stamps alone require 464 kb (=58 kB) of memory.

In U.S. Pat. No. 5,978,928, a system and method for managing a time-stamp is proposed wherein a table of time stamps is maintained. Each time-stamp corresponds to the age of a block of data. The age of the data is determined from the value of the time-stamp in the table. When a block of data is written, the time-stamp corresponding to the data is individually reset by writing a zero to the stamped value. Each stamp is aged by updating the time stamps at predetermined time intervals.

Aging a time-stamp includes reading the time-stamp, determining whether to advance the time-stamp, and advancing the time-stamp. A random number is generated for each time-stamp. The random number is compared to an increment threshold value. If the random number matches the increment threshold value, then the time-stamp is incremented.

However, a major drawback of this solution, apart from relying on randomness, is the need to update the entire state table in regular intervals.

U.S. Pat. No. 5,974,053 discloses an apparatus for providing service to entities. The apparatus includes a server for providing the service, and a plurality of entities which require the service of the server. A scheduler is provided for scheduling when each of the entities receives the service of the server. A time-stamp mechanism provides a longer-format time-stamp to a requesting entity of the plurality of entities whenever the requesting entity requests service from the server.

Further, the apparatus includes a device for compressing the longer-format time-stamp into a corresponding shorter-format window-based time-stamp and storing the shorter-format window based time-stamp. The scheduler schedules service by the server of the requesting entity based on the shorter-format window-based time-stamp stored in the memory. The window-based time-stamp is used to assign service times to entities. However, the window is non-adjustable in its size or position within the larger-format time-stamp.

SUMMARY OF THE INVENTION

In view of the foregoing and other problems, drawbacks, and disadvantages of the conventional methods and structures, a purpose of the present invention is to provide a method and structure in which an entire state table need not be updated at regular intervals.

A second purpose of the present invention is to provide a method and structure in which, if a window-based time-stamp is employed, then such a window can be adjusted in its size or position within, for example, a larger-format time-stamp.

In a first exemplary aspect of the present invention, a method (and apparatus) for determining in a system including an m-bit time counter, whether an event-occurrence time lies after a predetermined timeout-value, includes a stamp readout step for reading out of a time-stamp memory a stored time-stamp value, a time-difference determination step for determining the time-difference between the time-stamp value and the event-occurrence time, and a timeout-determination step for determining whether the time-difference is larger than the predetermined timeout-value. The event-occurrence time is represented by a subset of the bits of the m-bit time counter, the subset being determined by two of the following parameters: lower bit-position, upper bit-position, and subset width. The lower bit-position is dependent on the predetermined timeout-value.

With the unique and unobvious combination of features of the present invention, the invention has the advantage that the subset of bits of the counter, that subset also being referred to as a "window", does not have a fixed position but is variable in that position. This variability can be exploited in a way that trades resolution of the window against wrap around time of that window. This is particularly useful when the method is used in a system that is designed to cope with different time-out values, since the window position can be adapted to the different time-out values by shifting the window.

Further, although there is the possibility to have time-out values differing in their value between low and high, the memory need not be configured for the worst case, which would require setting the window size wide enough to simultaneously support the lowest and the highest selectable timeout-value, while not exceeding a given resolution inaccuracy or wrap-around inaccuracy. In systems that have a given window size supporting a maximum timeout-value, an increase of the maximum timeout-value would require an increase in the window size, whereas with the method according to the invention only a bit-position shifting would be performed.

In an exemplary embodiment according to the first aspect of the invention, a position determination step can be provided in which the lower bit-position is determined depending on the predetermined timeout-value. This step has the advantage that the determination is a part of the method, allowing to use, as an input, the predetermined timeout-value and within the method deriving therefrom the lower bit-position.

This also allows changing the predetermined timeout-value and to therefrom determine the corresponding new lower bit-position, thereby rendering the lower bit-position a variable component. This allows opening the system on which the method is performed to a higher range of time-out values while neither increasing the need for memory nor substantially increasing inaccuracy.

If after the stamp readout step a stamp write step is performed for writing the event-occurrence time as a new time-stamp value into the time-stamp memory, then the event-occurrence time automatically can be used as the time-stamp value for the next occurring event. This advantageously reduces the number of steps to be performed for the handling of subsequent events.

A wrap-correction step can be performed for correcting the time-difference in the case when the n-bit window has had a wrap between the time-stamp value and the event-occurrence time. This step has the advantage that the error possibility that is introduced by wraps is reduced, and hence the system on which the method is performed is more reliable with respect to the determination result and actions based thereupon. For example, with the determination being used for packet traffic control and policing, the number of wrong packet-handling decisions is reduced, thereby increasing quality of service.

A series of events that are defined to belong together is herein referred to as an "event flow." The time-stamp value can be the event-occurrence time of a first event, and the event-occurrence time that is compared with the time-stamp value can be the event-occurrence time of a second event. In such a case, these two events would belong to the same event flow. A typical example for an event flow would be the transmission of a series of data packets. The arrival time of each data packet would then be an event thereof. The time-difference would be the difference between the arrival times.

If time-stamp values of different event flows are stored in different memory cells of the time-stamp memory, then several such flows can be handled at the same time, thereby allowing the method to be performed on interleaved flows, such as might occur on communication lines with several simultaneous flows. Furthermore, for each of the different event flows, a different timeout-value can be used, which advantageously increases the variability of the system.

The method can further include a time-out action-step which is performed based on the result of the timeout-determination step. In the case of the time-difference being determined to be larger than the predetermined timeout-value, this being referred to here as a "time-out case," an action preferably targeted at the event, its dedicated memory cell, or the source of the corresponding event can be performed or triggered. Such action could preferably include the deletion of event-related or flow-related data or the reassignment of a resource to a different flow.

The invention also provides a computer program product including computer program code means which, when loaded in a processor of apparatus for determining whether an event-occurrence time lies after a predetermined timeout-value, configures the processor to perform a method as hereinbefore described.

In accordance with another exemplary aspect of the invention, an apparatus for determining whether an event-occurrence time lies after a predetermined timeout-value, includes a time-stamp memory for storing therein a time-stamp value, a time-difference determinator for determining the time-difference between the stored time-stamp value and the event-occurrence time, a time-out determinator for determining whether the time-difference is larger than the predetermined timeout-value, an m-bit time counter, from which a subset of the bits represents the event-occurrence time, the subset being determined by a lower bit-position and an upper bit-position. The lower bit-position is dependent on the predetermined timeout-value.

In an exemplary embodiment of the apparatus of the invention, the apparatus includes a value input for receiving the predetermined timeout-value, which provides the advantage that a user or administrator can provide the timeout-value to be used by the apparatus. Such input possibility increases ease of use by not necessitating the redesign of the apparatus each time a change of the timeout-value is desired.

An event-trigger input for receiving events and triggering, on reception of such a event, a readout of the stored time-stamp value from the time-stamp memory into the time-difference determinator, advantageously provides for the attachability of the apparatus to an event-loaded medium, such as a communication line transporting data packets.

If the apparatus further includes a bit-position determinator for determining the lower bit-position depending on the predetermined timeout-value, then the lower bit-position is automatically determinable by using the predetermined timeout-value, thereby allowing automatically adjusting the lower bit-position to the predetermined timeout-value. This can be designed advantageously such that a given inaccuracy-value remains substantially constant even in the case of different predetermined time-out values. A preferred inaccuracy-value would be the inaccuracy due to reduced resolution, or the inaccuracy due to reduced wrap-around time or an inaccuracy derived therefrom.

The apparatus in an exemplary embodiment of the present invention, also can include an input for the inaccuracy-value, thereby allowing a user or administrator to communicate to the apparatus the desired inaccuracy-value. An apparatus with this feature would provide even more freedom in system design.

BRIEF DESCRIPTION OF THE DRAWINGS

The foregoing and other purposes, aspects and advantages will be better understood from the following detailed description of exemplary embodiments of the invention with reference to the drawings, in which.

It is noted that all the figures are, for sake of clarity, not shown in real dimensions, nor are the relations between the dimensions shown in a realistic scale.

DETAILED DESCRIPTION OF EXEMPLARY EMBODIMENTS OF THE INVENTION

Figure 1:
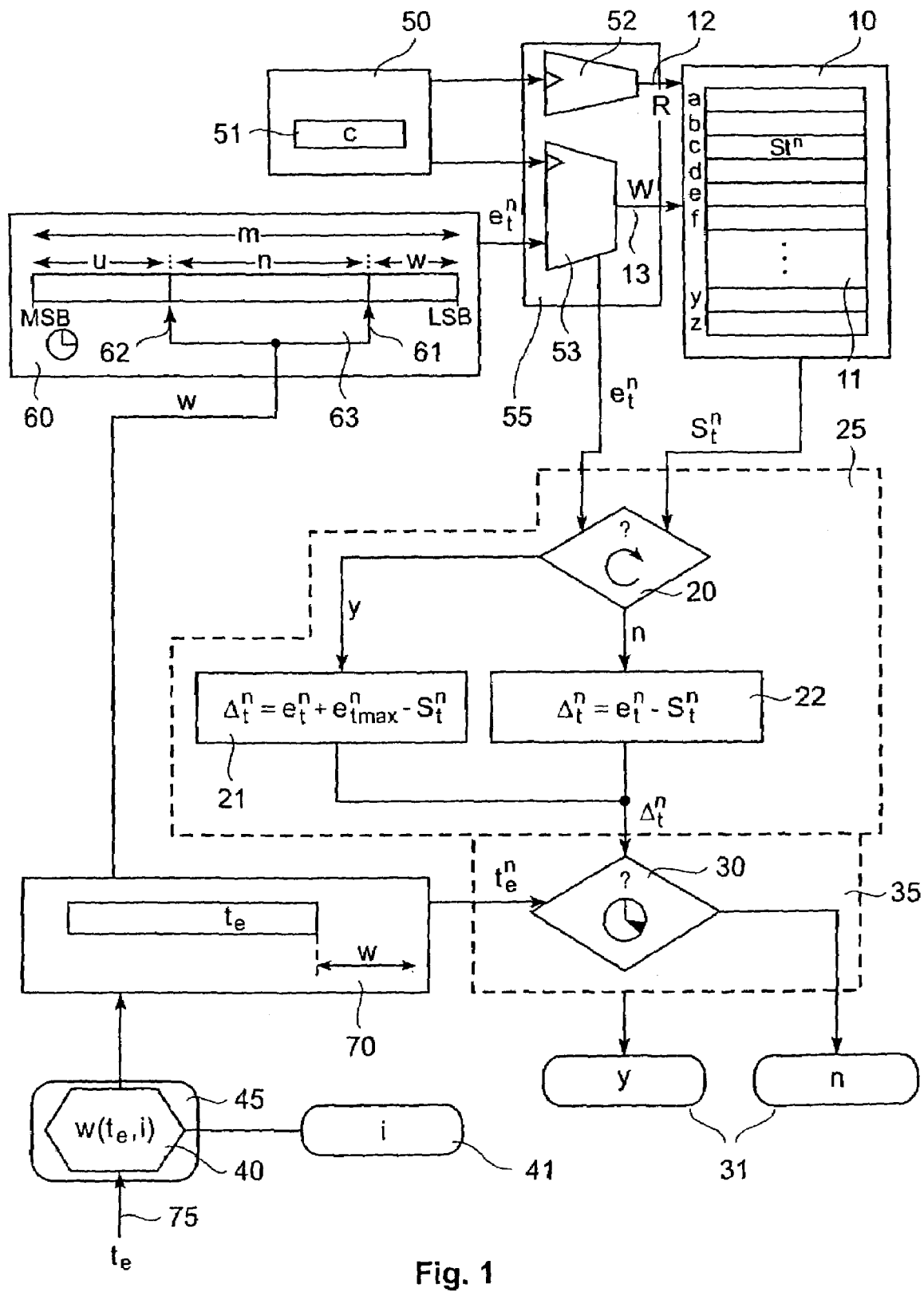
FIG. 1 is a schematic diagram, showing a mechanism using a time-stamp memory 10, a time counter 60, and a timeout-check mechanism.
Figure 2:
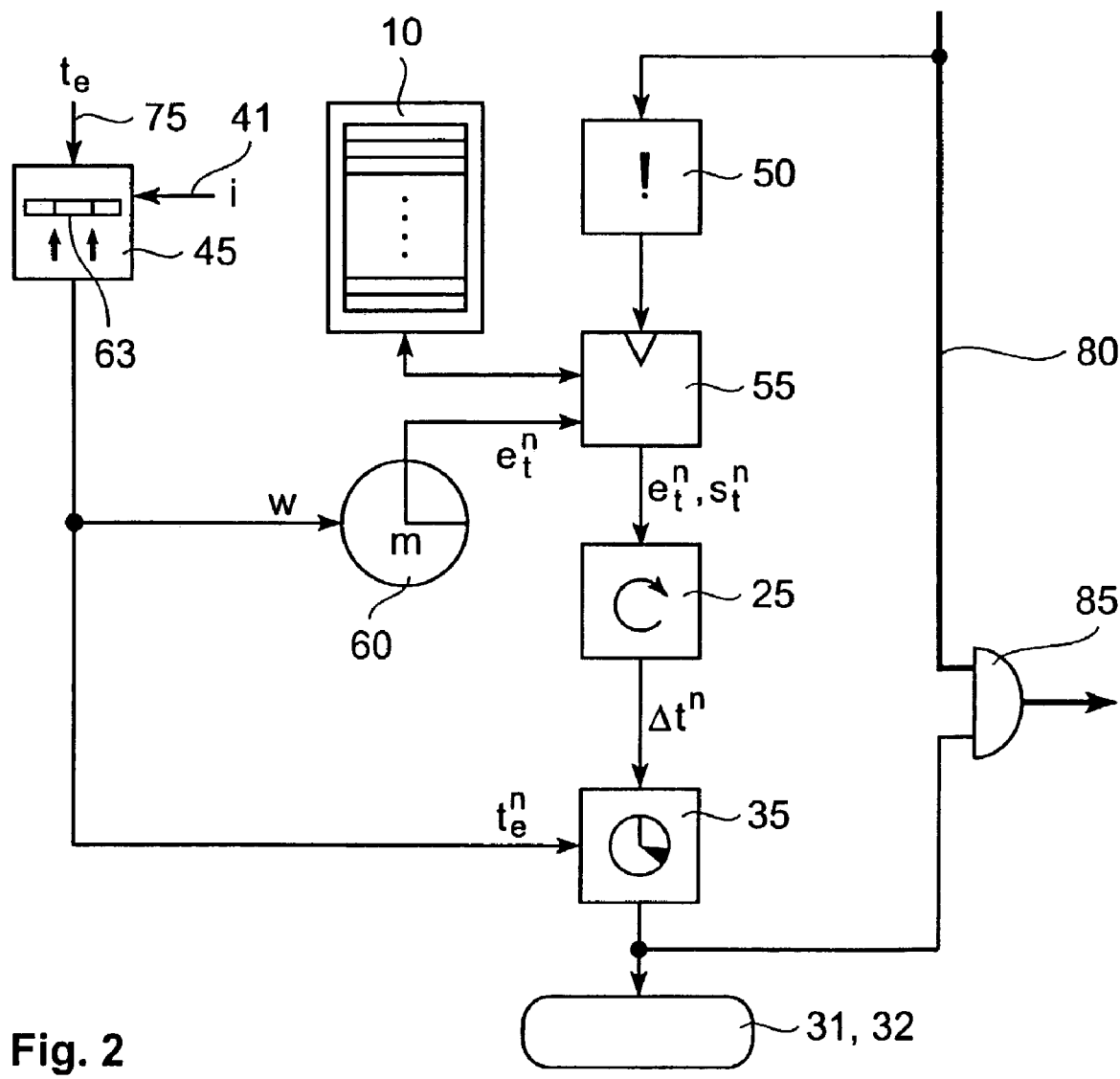
FIG. 2 is a block diagram of an apparatus comprising the time-stamp memory 10, the time counter 60, a difference determinator 25, and a time-out determinator 35.

Referring now to the drawings, and more particularly to FIGS. 1-2, there are shown exemplary embodiments of the method and structures according to the present invention.

Exemplary Embodiments

In the following, the various exemplary embodiments of the invention are described. The superscribed index n is used to make clear that the indexed variable has a width of n bits.

FIG. 1 is a schematic diagram showing a mechanism for determining whether an event-occurrence lies after a predetermined timeout-value.

Specifically, an event-trigger input 50 is arranged at an input side of a memory read/write controller 55 for a time-stamp memory 10. Memory 10 is connected to a time-out determinator 35 via a time-difference determinator 25. A bit-position determinator 45 with a timeout-value input 75 and an inaccuracy-value input 41 is arranged at an input of a timeout-value memory 70. Memory 70 is connected to the time-out determinator 35 and to an m-bit time counter 60 whose output is connected to the memory read/write controller 55.

The event-trigger input 50 is arranged for receiving events. A typical, exemplary event might be an arrival of a data packet on a communication connection. On occurrence of the event, event information 51 is determined (e.g., an identifier), being usable for identifying a flow to which the event belongs. A series of events that are defined to belong together is herein referred to as an "event flow."

In the example of a communication connection between two entities, wherein one entity sends packets of information to the other entity, every arrival of such a packet would constitute an "event," several of which form the corresponding event flow. Hence, the minimum number of events pertaining to a common flow is two.

More specifically, exemplarily, the arriving packet would be identified by reading its header and determining to which packet flow the packet belongs. Thus, a multitude of packet flows can run over the same communication line, and the event-trigger input 50 can distinguish between the packets belonging to different packet flows. The packet-flow identifier, or an identifier derived therefrom (e.g., by hashing or the like), can be used as the event information 51. The time-stamp memory 10 includes a number of memory cells 11, each of which is assigned to one event flow (i.e., a series of events that are defined as belonging together in the sense that the time-difference between the events of that event series is subject to a time-out assessment).

Hence, the number of memory cells 11 would be identical to the number of event flows to be handled. The event information 51 is used as the address of the memory cells 11, thereby allowing the selection of the memory cell 11 corresponding to the flow of the event (e.g., the arrived packet).

Using the event information 11, the event on its occurrence effects, via the read/write controller 55, the execution of a stamp readout step 12. The read/write controller 55 includes a readout controller 52 that is triggered by the occurrence of the event to read from the memory cell 11 (e.g., with the address corresponding to the event information 51) the therein stored information which is a stored time-stamp value $s_t^n$.

The stored time-stamp value $s_t^n$ is typically the point in time of a previous event pertaining to the same event flow. The stored time-stamp value $s_t^n$ is read into the time-difference determinator 25. The occurrence of the event also triggers another process step.

That is, the read/write controller 55 also includes a write-in controller 53 that on occurrence of the event is triggered to write the point in time of the occurrence of the event into the time-stamp memory 10. This point in time is represented by, and in the following referred to as, an "event-occurrence time $e_t^n$", and it is read from the time counter 60.

This write-in step, also referred to as stamp write step 13, is executed in a way that prevents writing the event-occurrence time $e_t^n$ to the corresponding memory cell 11 before the stored time-stamp value $s_t^n$ has been read out. Such overwrite prevention can be achieved by using read and write registers, or by using a timing mechanism or by other suitable means or methods. The event-occurrence time $e_t^n$ is written as new time-stamp value $s_t^n$ into the memory cell 11.

Hence, after the stamp readout step 12, the stamp write step 13 is executed for writing the event-occurrence time $e_t^n$ as new time-stamp value $s_t^n$ into the time-stamp memory 10. The reading of the event-occurrence time $e_t^n$ is triggered by the corresponding event, and the event-occurrence time $e_t^n$ is also read into the time-difference determinator 25.

The time counter 60 is preferably an m-bit counter counting the ticks of a system clock which can be a clock that is incremented with each system cycle. The bit-width of the counter 60 is larger than the bit-width of the event-occurrence time $e_t^n$. The event-occurrence time $e_t^n$ includes only a subset 63 of the bits of the time counter 60.

More specifically, the event-occurrence time $e_t^n$ includes a subset 63 that only uses the bits of the time counter 60, starting from a lower bit-position 61 and ending at an upper bit-position 62. The number of bits between these two positions is denoted with "n". The number of bits below the lower bit-position 61 is denoted with "w", and the number of bits above the upper bit-position 62 is denoted with "u".

For the sake of clarity, here the least significant bit (LSB) is the lowest bit, and the most significant bit (MSB) is the uppermost bit. Hence, the event-occurrence time $e_t^n$ is a window cutout from the system-time counter 60. In other words, from the m bits of the time counter 60, the lowest w bits and the uppermost u bits are cut off to form the n bits of the event-occurrence time $e_t^n$. Additionally, the time-stamp value $s_t^n$ only has a width of n bits, thereby reducing the size of the time-stamp memory 10 in comparison with a memory size that would be necessary if the full m bits of the time counter 60 were used for the stored time-stamp values $s_t^n$.

In the time-difference determinator 25, a time-difference determination step 21, 22 for determining the time-difference $\Delta_t^n$ between the time-stamp value $s_t^n$ and the event-occurrence time $e_t^n$ is executed. Step 21, 22 is combined with a wrap-correction step 20. The wrap-correction step 20 is for correcting the time-difference $\Delta_t^n$ when the n-bit window 63 has had a wrap between the event-occurrence time $e_t^n$ and the point in time that corresponds to the time-stamp value $s_t^n$.

Therefore in the wrap-correction step 20, it is determined whether the event-occurrence time $e_t^n$ is later than the stored time-stamp value $s_t^n$. If that is the case (e.g., event-occurrence time $e_t^n$ is later than the stored time-stamp value $s_t^n$), then it is assumed that no window wrap has occurred between those two points in time. Based on this assumption, the time-difference $\Delta_t^n$ is determined to be the event-occurrence time $e_t^n$ minus the stored time-stamp value $s_t^n$. This determination is referred to as "no-wrap-case determination 22."

Of course, there is a probability that there has been a wrap of the window 63 which, however, is not recognizable by pure comparison of the two points in time. Such a wrap is here simply neglected, and accepted as an inherent fault with respect to the later timeout-determination step. The fault may lead to a no-timeout result, although the time-out condition is satisfied, which might lead to a non-justified timeout-detection and action based thereupon.

In the opposite case (i.e., when the event-occurrence time $e_t^n$ is earlier than or equal to the stored time-stamp value $s_t^n$), a counter wrap has occurred. Hence, the time-difference $\Delta_t^n$ is determined to be the event-occurrence time $e_t^n$ minus the stored time-stamp value $s_t^n$ plus the maximum value of the event-occurrence time $e_t^n$, denoted as maximum event-occurrence time $e_{tmax}^n$. This determination is referred to as "wrap-case determination 21."

This determination 21 eliminates the possibility of negative values of the time-difference $\Delta_t''$, thereby reducing the probability of erroneous timeout-determination results. Also, here a certain probability exists that not only a single wrap has occurred, but that several wraps have occurred. This case herein is also neglected, thereby accepting the inherent fault resulting therefrom.

The time-difference $\Delta_t''$ has logically also a width of n bits.

In a timeout-determination step 30, it is determined whether the time-difference $\Delta_t''$ is larger than a predetermined timeout-value $t_e$. The timeout-value $t_e$ is given as a number of system-clock cycles, and is maintained in the timeout-value memory 70, where it has been stored via the bit-position determinator 45. The timeout-value memory 70 is not mandatorily necessary, because the output of the bit-position determinator 45, including the lower offset w and the timeout-value $t_e$, can be led directly to the time counter 60 and the time-out determinator 35.

The stored timeout-value $t_e$ provides to the connected units 60, 35 its value (i.e., number of clock cycles), and the subset width n and the number w of lower bits. Hence, the timeout-value $t_e$ here has a width of n bits, and these bits are to be positioned at the lower bit-position 61, determined by the number w of lower bits.

If the time-difference $\Delta_t''$ is larger than the predetermined timeout-value $t_e$, then the time-out condition is fulfilled, which corresponds to a time-out case. In such a case, the event is detected as being non-compliant. In the case of the event being the arrival of a data packet, for example, the packet can be refused. The timeout-value $t_e$ can also have a smaller width than n bits, since typically the timeout-value $t_e$ will be only a fraction of the maximum value of the event-occurrence time $e_t''$.

In the opposite case (i.e., when the time-difference $\Delta_t''$ is smaller than the predetermined timeout-value $t_e$), the time-out condition is not fulfilled, which corresponds to a no-timeout case. In such a case, the event is detected as being compliant. In the case of the event being the arrival of a data packet, for example, the packet can be accepted.

The time-difference $\Delta_t''$ wraps with the same periodicity as the subset 63. When the time-difference $\Delta_t''$ is determined to be smaller than the timeout-value $t_e$, a probability exists that a time-difference wrap has occurred which has not been detected.

The subset 63 has the advantage of being smaller in width than the full m-bit time-stamp value. On the other hand, the lower bit-position 61 determines the time resolution of the subset 63. The higher the lower bit-position 61 (i.e., the bigger w is), the less precise the subset 63 is concerning the time.

Thus, for the functionality of the subset 63 (e.g., serving as a time-stamp for marking the occurrence of the events), a larger number w of lower bits will lead to a less precise determinability of whether the event that is subject to the timeout-determination method, has occurred before or after the timeout-value. Hence, time resolution is the cost for saving on memory space on the lower bit-position 61.

The upper bit-position 62 determines the wrap-around fault probability for time-difference $\Delta_t''$. The lower the upper bit-position 62 is (i.e., the bigger u is), the smaller is the wrap-around time of the time-difference $\Delta_t''$. The smaller the wrap-around time is, the higher the probability of wrap-induced error is, explained above as fault source in the timeout-determination.

Thus, for the functionality of the subset 63 (e.g., serving as a time-stamp for marking the occurrence of the events), a larger number u of higher bits will lead to a higher wrap probability, and hence a reduced reliability of the result of the timeout-determination method. Hence, wrap-around-induced uncertainty is the cost for saving on memory space on the higher bit-position 62.

The inaccuracy $i_r$ due to the reduced resolution is here exemplarily defined by $$i_r = \frac{2^w}{t_e} \tag{I}$$

and the inaccuracy $i_{wr}$ due to the reduced wrap around time is here exemplarily defined by $$i_{wr} = \frac{t_e}{2^{n+w}} \tag{II}$$

Therefrom follows that the product from both inaccuracies is only a function of the subset width n:

$$i_r \cdot i_{wr} = \frac{1}{2^n} \tag{III}$$

It becomes apparent that, with rising lower bit-position 61, the inaccuracy $i_r$ due to the reduced resolution increases, while at the same time the inaccuracy $i_{wr}$ due to the reduced wrap-around-time decreases, and vice versa. It becomes also clear that, using the above models for inaccuracy, it is basically not important which of the two linearly interdependent inaccuracies $i_r$, $i_{wr}$ is used for determining the lower bit-position 61.

Using a numerical example with m=18, w=4, u=4, n=10, the subset 63 has 1/16 of the time counter's resolution, and the wrap around value will be 32,768. The resolution r is hence here $2^w=16$. With a timeout-value $t_e$ of 800 cycles of the system clock, the inaccuracy $i_r$ due to the resolution is 16/800=2%, whereas the inaccuracy $i_{wr}$ due to the wrap around is 800/32,768=2.4%.

With a constant subset width n, one inaccuracy becomes bigger as the other becomes smaller, when changing the value of w or u, respectively. This interdependence is exploited by taking advantage of the fact that, for a larger timeout-value $t_e$, a larger wrap around time is preferential, and, at the same time, a lower resolution is a less critical parameter.

That is, compared to the large timeout-value $t_e$, the lower bits of the time counter 60 play a minor role in determining whether an event has occurred before or after the timeout-value $t_e$. Hence, this allows moving the subset 63 towards higher bits, without increasing its width, in the case of a higher timeout-value $t_e$.

On the other hand, for a smaller timeout-value $t_e$ a higher resolution is preferential, and, at the same time, a lower wrap around time is a less critical parameter, because in the case of events for which a small timeout-value $t_e$ is used, the probability that these events take so much time that a wrap occurs, is typically smaller, such that the higher bits of the time counter 60 play a minor role in determining whether an event has occurred before or after the timeout-value $t_e$. Hence, in the case of a lower timeout-value $t_e$ the subset 63 can be moved towards lower bits, without increasing its width n, but with increasing the resolution accuracy. This position adjustment can be performed automatically in a position determination step 40.

In the position determination step 40, the lower bit-position 61, also referred to as "lower offset," is determined in dependence on the predetermined timeout-value $t_e$. In addition, here a predetermined inaccuracy-value i is used as input to the bit-position determinator 45, having been entered via the inaccuracy-value input 41. This inaccuracy-value i can preferably be either the inaccuracy $i_{wr}$ due to the reduced wrap around time, or the inaccuracy $i_r$ due to the reduced resolution. In principle, it can also be a value derived from one of these two inaccuracies $i_{wr}$, $i_r$ or even from both. A preferred embodiment would have the inaccuracy-value i stored in a memory or register of the inaccuracy-value input 41. Typically, the inaccuracy-value i is maintained constant over a certain period of time, thereby reflecting that it is an aim in a system to provide a substantially constant inherent accuracy.

Using a constant inaccuracy-value i would then lead to a dependency $w(t_e)$ which effectuates a shifting of the subset 63 within the time counter 60 depending on the applicable value of the predetermined timeout-value $t_e$. For instance, as the inaccuracy-value i, the inaccuracy $i_r$ due to the reduced resolution could be used. In that case, the subset shifting would effectuate this inaccuracy $i_r$ due to the reduced resolution to remain substantially constant.

Using the inaccuracy $i_r$ due to the reduced resolution, a possible formula to define the lower offset 61 is $$w = ld(i_r * t_e). \quad (IV)$$

Using the inaccuracy $i_{wr}$ due to the reduced wrap-around time, a possible formula to define the lower offset 61 is $$w = ld\left(\frac{t_e}{i_{wr}}\right) - n \quad (V)$$

These two formulas are a preferred embodiment of a determination function for determining from the timeout-value $t_e$ the lower bit-position 61. Generally, any dependence that incorporates a proportionality between the timeout-value $t_e$ and the lower bit-position 61 in principle appears suited to have the desired effect, namely to move the subset 63 into the direction given by the timeout-value $t_e$, thereby reducing the necessary memory space for a substantially constant inaccuracy i.

$$w \sim t_e \quad (VI)$$

For event flows for which a maximum event-occurrence time can be predicted (e.g., by inherent limiting technical circumstances), of course the subset 63 need not be shifted beyond a maximum lower bit-position 61. Such a cutoff position can also be implemented in the dependency between the timeout-value $t_e$ and the lower bit-position 61, and hence in the determination function. Alternatively, the cutoff position can be defined as the maximum tolerated event-occurrence time, typically using a point in time after which the occurrence probability is relatively low.

The determination function can also be altered to reflect a saturation effect which is inherent to most normal probability distributions. Thus, although the probability of an event occurring at a very late point in time will typically not be zero, the additional benefit of moving the subset 63 to higher values of the lower bit-position 61 is lower there. Therefore, a non-linear dependence between the timeout-value $t_e$ and the lower bit-position 61 is preferential.

The fact that the number of different values for the lower bit-position 61 is anyway limited to $$w_{max} = m - n, \quad (VII)$$

may in addition be integrated into the determination function.

Instead of the determination functions IV and V with or without the explained non-linear alterations, also a function that is an approximation thereto (e.g., a finite Taylor approximation), would lead to the desired advantage.

Taking into account the above considerations, the determination function can in a preferred embodiment be implemented by a table which for each possible value of the lower bit-position 61, gives the range for the timeout-value $t_e$ which corresponds thereto. Such a table would require less calculation power and due to the limited number of possible lower bit positions 61, have a limited size.

The subset width n is preferably kept constant, such that the time-stamp memory 10 can be designed to have its minimum possible size. Since the result of the logarithmic function in the determination functions IV and V is not necessarily a full (e.g., a whole) number, the result can be rounded up or down to one of the next whole numbers for w.

To not exceed the given inaccuracy-value i, it is preferable to round down to the lower full number for w, in the case the inaccuracy-value i is derived from the inaccuracy $i_r$ due to the reduced resolution, and to round up to the next full number for w in case the inaccuracy-value i is derived from the inaccuracy $i_{wr}$ due to the reduced wrap-around time.

The arrangement can be designed to offer the possibility to input the inaccuracy-value i externally (e.g., by the user, or a system administrator), or the inaccuracy-value i can be stored as a value in the inaccuracy-value input 41, which for this purpose can be realized by a storage means, such as a register, and only being alterable by accessing the inaccuracy-value input 41 (e.g., in the process of system design).

The above determination can be automated in that the bit-position determinator 45 includes an implementation of a determination function such as those given in formulas IV, V in the form of a circuit, or preferably in the form of a computer program that receives as input the timeout-value $t_e$, furthermore accesses the inaccuracy-value i, and delivers the lower offset w. Here, the subset width n would be fixed.

Hence, the time counter 60 receives the lower offset w from the timeout-value memory 70 or from the bit-position determinator 45. A logical equivalent would, of course, be the upper offset u, because the values for the subset width n and the time counter width m are known, thereby leading to the lower offset w according to the formula VIII given below. In the time counter 60, the received value for the lower offset w is used for the according positioning of the subset 63. Hence, the n-bit window 63 in the time counter can be moved (i.e., the lower offset of w bits is variable and the upper bit-position 62, also referred to as an "upper offset," can be determined to be $$u = m - n - w \quad (VIII)$$

It is also possible to use an individual timeout-value $t_e$ for each flow (e.g., by storing that individual timeout-value $t_e$ or a pointer or identifier therefor together with each time-stamp value $t_e$ in the time-stamp memory 10). Thus, the window position (i.e., lower offset w) can be individually determined for each flow.

The window position can also be designed to be manually configurable. That is, the bit-position determinator 45 may not be present, and that instead the timeout-value $t_e$ is entered already in the form that gives the value for the lower offset w. Thus, the entering entity would in principle perform the operation that is performed otherwise by the bit-position determinator 45. Typically, that entity would preferably utilize therefore a determination function similar to the formulas V or VI above, utilizing a predetermined value for the inaccuracy-value I.

The dependence of the lower bit-position 61 on the timeout-value $t_e$ would then be manifested in that, for substantially different time-out values $t_e$, different lower offsets w are present. In any case, the time counter 60 includes at least a position input via which the lower bit-position 61 or the lower offset w, is inputted thereinto. Either the subset width n is already implemented within the time counter 60, or it is also input via the position input or another input.

In FIG. 2, a block diagram of an apparatus is depicted for determining whether the event-occurrence time $e_t^n$ lies after the predetermined timeout-value $t_e$. FIG. 2 shows the different units that are interoperating to perform the determination functionality.

The event-trigger input 50 is arranged at the input side of the memory read/write controller 55 for the time-stamp memory 10. The memory read/write controller 55 provides for the access to the time-stamp memory 10 (i.e., reading out stored information and storing information therein). It is connected to the time-out determinator 35 via the time-difference determinator 25.

The bit-position determinator 45, having the value input 75 and also the inaccuracy-value input 41, is connected to the time-out determinator 35 and to the m-bit time counter 60 whose output is lead to the memory read/write controller 55. The event-trigger input 50 is connected to a communication line 80 on which the events are expected to occur.

Here, these events will be, for example, the arrivals of packets. The apparatus is here exemplarily arranged for deciding whether an arriving packet is to be accepted or not. A packet acceptance policy is implemented that declines the acceptance of a packet if it is found to have arrived after a predetermined maximum arrival time, which exemplarily herein is the timeout-value $t_e$. Such a packet is declared non-compliant, not accepted and dropped. A packet arriving before the expiry of the timeout-value $t_e$, is deemed compliant, and hence accepted.

The communication line 80 is led together with the output of the time-out determinator 35 to a gate 85 that only lets pass those packets that have been determined as compliant. In contrast, those packets that are determined as non-compliant will not pass the gate 85. The compliance determination is performed by triggering the readout of the stored time-stamp value $s_t^n$ from the time-stamp memory 10, and performing in the difference determinator 25 the difference determination between the stored time-stamp $s_t^n$ and the event-occurrence time $e_t^n$ that is delivered by the time counter 60, and performing in the time-out determinator 35 the check whether the resulting time-difference $\Delta_t^n$ of the previous step exceeds the timeout-value $t_e$.

The event-occurrence time $e_t^n$ delivered by the time counter 60 includes only a subset 63 of the m bits of the counter. The position of that subset 63 within the time counter 60 is determined by the bit-position determinator 45, which determines the subset position based on the timeout-value $t_e$. The event-occurrence time $e_t^n$ and the stored time-stamp $s_t^n$ are determined to have the same position within the time counter 60, whereby it is ensured that both values that are processed within the time-difference determinator 25, are bit-wise correctly adjusted with respect to each other.

However, the subset position need not necessarily be the same for subsequent events of the same event flow. An alteration of the timeout-value $t_e$, leading to an altered value of the lower offset w, can be performed. The time-stamp $s_t^n$, is in that case, stored in the time-stamp memory 10 under use of the altered value of the lower offset w to ensure bit-wise adjustment. This can be realized either directly within the stamp write step 13 of the next time-stamp $s_t^n$, or in a rewriting of that time-stamp $s_t^n$ using the altered value of the lower offset w.

Via the inaccuracy-value input 41, the bit-position determinator 45 can receive the inaccuracy-value i that will be used in addition to the timeout-value $t_e$ to determine the lower offset w. The inaccuracy-value i can be variable or constant. It is also possible not to use the input of the inaccuracy-value i to the bit-position determinator 45, and instead have a fixed inaccuracy-value i implemented within the bit-position determinator 45. In such a case, the inaccuracy-value input 41 can be renounced.

Regarding the time-out determinator 35, here the bit positions of its two input parameters, time-difference $\Delta_t^n$ and timeout-value $t_e$, preferably are identical to ensure proper determination. The time-out determinator 35 is designed to use from the timeout-value $t_e$ those bits that correspond to the respective bits of the time-difference $\Delta_t^n$.

The above-described method and apparatus according to the present invention has many applications. For example, an address resolution mechanism, such as Internet-Protocol-ARP or LAN-Emulation-ARP, is envisaged, using the determination result as a basis to decide whether to drop address pairs that have not been updated within a certain time frame.

Another application is a content cache, such as a web cache, where data that has reached a certain age is decided to be updated (e.g., for use with dynamic pages).

The following examples are applications in which the next event is not necessarily of the same type as the previous event. An example would be to perform the timeout-determination method at a fixed point in time at which for an event flow its status shall be determined. At that point in time, an artificial determination point is set by triggering the determination method, regardless of whether in the investigated flow an event has occurred or not. This is particularly useful if a next event is not desired to be waited for, in order to determine whether a time-out condition is fulfilled or not. If at that point in time it is found that the timeout-value $t_e$ has already expired, then a next event need not be waited for, and the time-difference $\Delta_t^n$ is naturally bigger than the timeout-value $t_e$.

In transmission control protocol (TCP) for example, if the user time-out expires, then the decision can be to flush all queues, send to the user a message that the connection has been aborted due to user time-out and for any outstanding calls, to delete the Transmission Control Block (TCB) and enter the CLOSED state for that connection. If a time-wait time-out expires on a connection, then the decision can be to delete the TCB and enter the CLOSED state. Tunnels, such as ATM shortcuts, are torn down when they have not seen any traffic before a time-out.

Such a decision can be integrated into the method or the apparatus, respectively. The method can then comprise a time-out action-step that is performed once the time-out condition has been determined to be present (i.e., the event not having occurred before the timeout-value $t_e$). The time-out action-step can be any of the above steps, in general, a step that performs an action on the event flow on which an event-occurrence before the timeout-value $t_e$ has not been detected.

However, the method can also be designed to include a no-timeout action-step that is performed when the time-out condition has been determined to not be present (i.e., the event having occurred before the timeout-value $t_e$). The no-timeout action-step is a step that performs an action on the event flow on which an event-occurrence before the timeout-value $t_e$ has been detected.

Such action may include deletion of data, in particular flow- or event-related data, notification of an entity, such as a user or the entity which has been in control of the events or flows, or amending a parameter (e.g., increasing or decreasing the available bandwidth on a communication connection on which the events have been detected, or increasing or decreasing a bandwidth-use charge that must be paid by an entity, or a network-related operation such as a re-routing of events or flows to reduce or increase event traffic on a communication connection).

It is obvious for the person skilled in the art that the present invention can be realized in hardware, software, or a combination of these. Also, the present invention can be implemented in a centralized fashion on one single computer system, or in a distributed fashion where different elements are spread across several interconnected computers or computer systems, whereby any kind of a computer system (or other apparatus adapted for carrying out the methods described herein) is suitable.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which when loaded in a computer system is able to carry out these methods.

"Computer program means" or "computer program" in the present context mean any expression, in any language, code or notation, of a set of instructions intended to cause a system having an information processing capability to perform a particular function either directly or after either or both of the following a) conversion to another language, code or notation; or b) reproduction in a different material form.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A method for determining in a system comprising an m-bit time counter, whether an event-occurrence time ($e_t''$) lies after a predetermined timeout-value ($t_e$), said method comprising:
   a stamp readout step for reading out of a time-stamp memory a stored time-stamp value ($s_t''$);
   a time-difference determination step for determining the time-difference ($\Delta_t''$) between said time-stamp value ($s_t''$) and said event-occurrence time ($e_t''$); and
   a timeout-determination step for determining whether said time-difference ($\Delta_t''$) is larger than said predetermined timeout-value ($t_e$),
   wherein said event-occurrence time ($e_t''$) is represented by a subset of bits of the m-bit time counter, said subset being determined by a plurality of parameters, said plurality of parameters including any two of a lower bit position (w), an upper bit-position (u), and a subset width (n),
   wherein (u=n+w),
   wherein a predetermined timeout period comprises said predetermined timeout value ($t_e$) multiplied by $2^w$ clock cycles, and
   wherein said lower bit-position (w) is predetermined and dependent on said predetermined timeout-value ($t_e$).

2. The method according to claim 1, further comprising a position determination step wherein said lower bit-position is calculated in dependence on a predetermined inaccuracy value (i) and on said predetermined timeout-value ($t_e$).

3. The method according to claim 1, further comprising:
   after said stamp readout step, a stamp write step for writing said event-occurrence time ($e_t''$) as a new time-stamp value ($s_t''$) into said time-stamp memory.

4. The method according to claim 1, further comprising:
   a wrap-correction step for correcting the time-difference ($\Delta_t''$) when the m-bit time counter has had a counter wrap between said time-stamp value ($s_t''$) and said event-occurrence time ($e_t''$).

5. The method according to claim 1, further comprising:
   in said time-stamp memory, storing time-stamp values ($s_t''$) of different event flows in different memory cells.

6. A computer-readable medium comprising a program code for performing the method according to claim 1.

7. An apparatus for determining whether an event-occurrence time ($e_t''$) lies after a predetermined timeout-value ($t_e$), comprising:
   a time-stamp memory for storing therein a time-stamp value ($s_t''$);
   a time-difference determinator for determining a time-difference ($\Delta_t''$) between said stored time-stamp value ($s_t''$) and said event-occurrence time ($e_t''$);
   a time-out determinator for determining whether said time-difference ($\Delta_t''$) is larger than said predetermined timeout-value ($t_e$); and
   an m-bit time counter, from which a subset of n bits represents said event-occurrence time ($e_t''$),
   wherein said subset is determined by a lower bit-position (w) and an upper bit-position (u) such that (u=n+w),
   wherein a predetermined timeout period comprises said predetermined timeout value ($t_e$) multiplied by $2^w$ clock cycles, and
   wherein said lower bit-position (w) is predetermined and dependent on said predetermined timeout-value ($t_e$).

8. The apparatus according to claim 7, further comprising:
   a value input for receiving said predetermined timeout-value ($t_e$).

9. The apparatus according to claim 7, further comprising:
   an event-trigger input for receiving events and triggering, on reception of an event, a readout of said stored time-stamp value ($s_t''$) from said time-stamp memory into said time-difference determinator.

10. The apparatus according to claim 8, further comprising:
    an event-trigger input for receiving events and triggering, on reception of an event, a readout of said stored time-stamp value ($s_t''$) from said time-stamp memory into said time-difference determinator.

11. The apparatus according to claim 7, further comprising:

a bit-position determinator for determining said lower bit-position based on said predetermined timeout-value ($t_e$).

12. The apparatus according to claim 8, further comprising:
a bit-position determinator for determining said lower bit-position based on said predetermined timeout-value ($t_e$).

13. The apparatus according to claim 7, wherein the in-bit time counter comprises a position input for receiving a value of the lower bit-position.

14. The apparatus according to claim 8, wherein the m-bit time counter comprises a position input for receiving a value of the lower bit-position.

15. A method for determining in a system comprising an m-bit time counter, whether an event-occurrence time ($e_t''$) lies after a predetermined timeout-value ($t_e$), said method comprising:
determining a time-difference ($\Delta_t''$) between a time-stamp value ($s_t''$) and said event-occurrence time ($e_t''$); and
determining whether said time-difference ($\Delta_t''$) is larger than said predetermined timeout-value ($t_e$),
wherein said event-occurrence time ($e_t''$) is represented by a subset of the bits of the m-bit time counter, said subset being determined by a plurality of parameters including any two of a lower bit-position (w), an upper bit-position (u), and a subset width (n) such that (u=n+w), and where in a predetermined timeout period comprises said predetermined timeout value ($t_e$) multiplied by $2^w$ clock cycles.

16. The method of claim 15, further comprising:
reading out of a time-stamp memory a stored time-stamp value ($s_t''$).

17. The method of claim 15, wherein said lower bit-position (w) is predetermined and dependent on said predetermined timeout-value ($t_e$).

18. The method according to claim 16, further comprising:
after said reading out of said time-stamp value, writing said event-occurrence time ($e_t''$) as a new time-stamp value ($s_t''$) into said time-stamp memory,
wherein, in said time-stamp memory, time-stamp values ($s_t''$) of different event flows are stored in different memory cells.

19. The method according to claim 15, further comprising:
correcting the time-difference ($\Delta_t''$) when the m-bit time counter has had a counter wrap between said time-stamp value ($s_t''$) and said event-occurrence time ($e_t''$).

* * * * *